3,319,331
METHOD FOR PRODUCING BALL POINT WRITING INSTRUMENTS
Hans Reinhard Fehling, Zug, Switzerland, and Alfred Dennis Street, Pinner, England, assignors to I.R.C. Limited, London, England, a company of Great Britain
Filed Mar. 15, 1965, Ser. No. 439,659
Claims priority, application Great Britain, Mar. 17, 1964, 11,280/64
6 Claims. (Cl. 29—441)

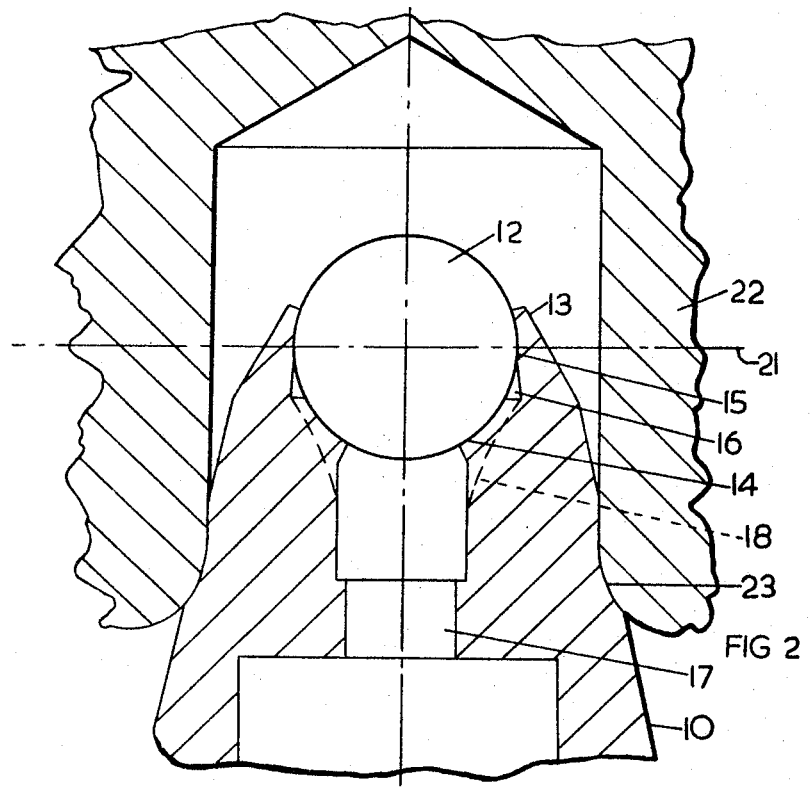

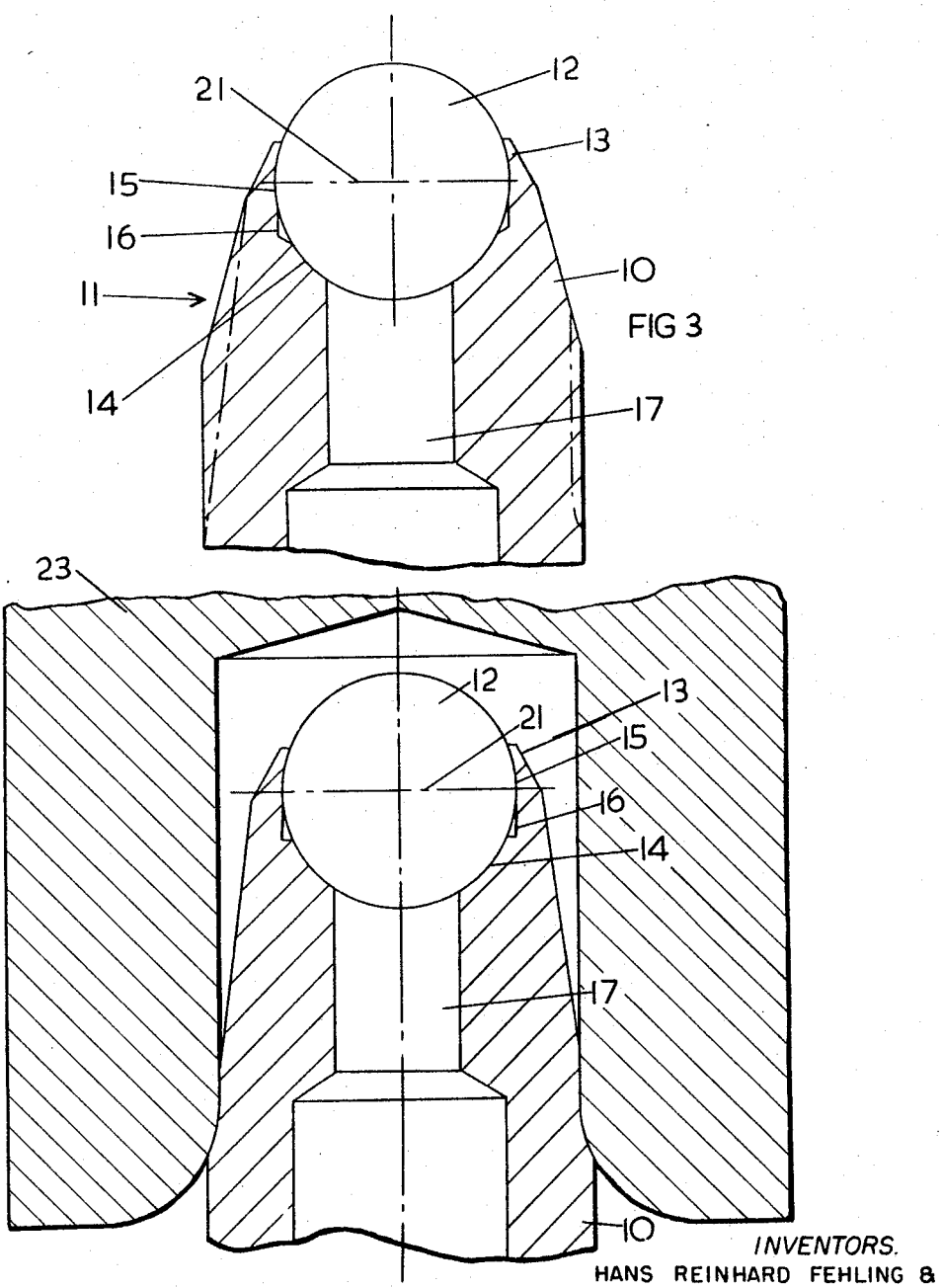

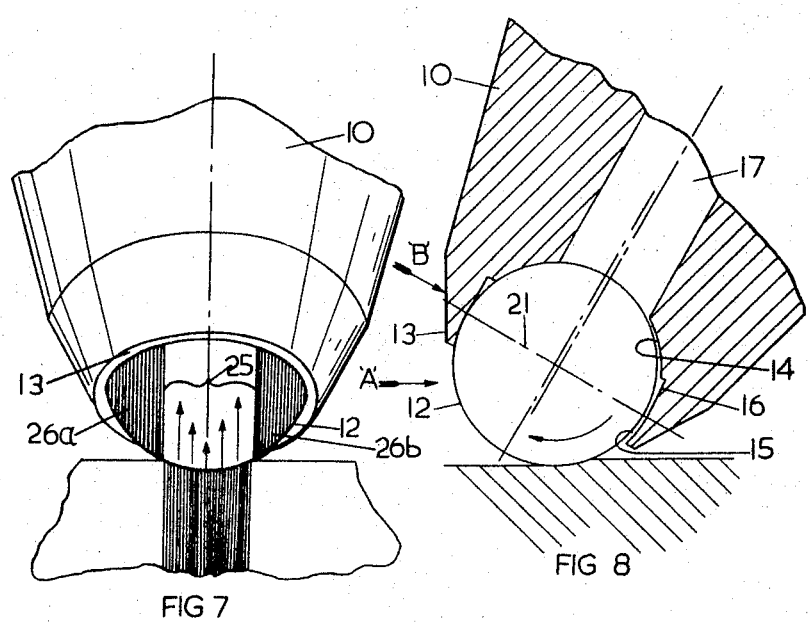
FIG 7
FIG 8
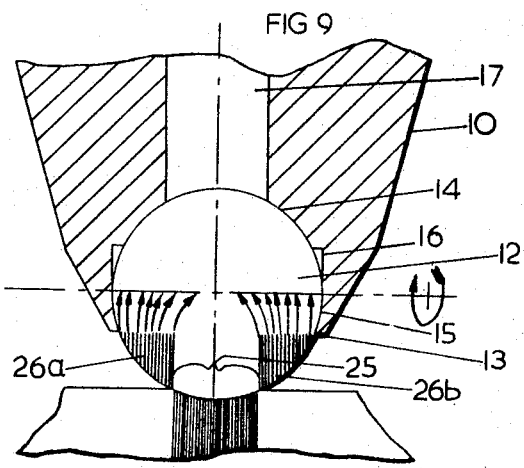
FIG 9
INVENTORS.
HANS REINHARD FEHLING &
ALFRED DENNIS STREET United States Patent Office 3,319,331
Patented May 16, 1967

This invention relates to the writing extremity or "nib" of ball point writing instruments, and more particularly to a method for producing the same.

The writing extremity or nib of a ball point writing instrument is that part in which, in use, the writing ball is rotatably housed in a socket or housing with a portion of its surface exposed so the ball can be applied to the writing surface, to make a trace thereon, the ball being retained in its socket or housing by an inturned rim or lip. In an acceptable writing extremity, the housing must provide in its interior a part-spherical base seat conforming closely to the curvature of the ball surface and affording a back stop for the ball, along with a part-spherical or substantially part-spherical lateral seat encircling the ball, and an annular ball encircling cavity separating the lateral seat from the base seat. Moreover, the center or centers of curvature of the base seat and the lateral seat must lie on the longitudinal axis of the housing, and there must be a feed duct leading through the base seat to the socket or housing to supply ink to the ball, the base seat being intersected by a plurality of ink grooves or channels leading laterally outwards from the feed duct to the cavity so as to communicate with the latter and to subdivide the base seat into a plurality of base seat surfaces. Typical designs of such a writing extremity or nib are shown in the United States patent to Fehling No. 3,000,090 and in the United States application of Fehling et al. Ser. No. 110,518, filed May 16, 1961, for "Nib Housing for Ball Point Writing Instrument," now abandoned.

In addition to the foregoing structural considerations, there are other requirements to be fulfilled by a writing extremity or nib, which are numerous and severe, if a fully satisfactory trace is to be produced and hitherto it has been impossible to fulfill all at the same time in a given construction of nib. It has, for example, been impossible to produce a nib which gives a faultless trace of great depth without the nib becoming messy with accumulated ink at least after a time. On the other hand, if, in order to minimize this last-mentioned drawback, the ink consumption was reduced by making a tighter ball housing, this has resulted in the trace being too faint to be fully satisfactory and the feel of the writing instrument a little stiff and too harsh, thus requiring too much effort in writing.

It is an object of this invention at least to minimize these difficulties and to provide a new and improved method of making a nib which is more satisfacory than those made heretofore.

These and other objects of the invention are attained by providing a ball point writing extremity in which the clearance between the writing ball and the lateral ball seat increases toward the forward end of the housing when the ball is held against the base seat at the rear of the socket. Moreover, the lateral seat is circular in all transverse sections normal to the longitudinal axis of the housing, and the radius of curvature of the lateral seat in all planes containing said longitudinal axis is greater than that of the base seat. More particularly, the construction is such that when the ball is pushed along the said longitudinal axis into contact with the base seat, the ball surface does not make contact with the lateral seat but there exists a clearance between the ball surface and the lateral seat which (a) in all said transverse sections forms a circular annulus of uniform width and (b) in all longitudinal sections containing said axis, increases in width from the lower edge of the lateral seat towards its upper edge. In a particular embodiment of the invention, the clearance between the ball surface and the lateral seat is at least 2 and preferably 4 microns at the lower edge of the lateral seat, increasing to 5 and preferably 10 microns at the upper edge. Also, the total area of the base seat surfaces is not less than 5 percent of the ball surface area and the lateral seat extends below the ball equator not less than 2.5 percent of the ball diameter.

In the specification and claims herein, the circumference of the ball on a plane going through the center of the ball at right angles to the longitudinal axis of the housing will be called the "equator" of the ball. The term "above" and "below" the equator will be used to denote respectively those parts of the housing walls extending from the equator towards the forward and the rear end of writing extremity.

The grooves or channels between the base seats should preferably have, at the narrowest section, a total cross-sectional area sufficient to feed a surplus of ink to the ball encircling cavity. For example, in the case of a housing for a ball 1 mm. in diameter, they should have a total cross-sectional area at said narrowest section of at least 0.02 mm.$^2$. It is also preferred that the lateral seat shall extend below the ball equator not less than 3.5 percent and not more than 8 percent of the ball diameter and above the equator not less than 17 percent and not more than 25 percent of the ball diameter.

In order to provide an improved writing extremity according to the invention, the lip surrounding the ball at the forward end of the housing is first deformed laterally inwardly to provide the part-spherical lateral ball seat extending above and below the ball equator. The housing socket is then deformed to provide a slight clearance between the ball and the lateral seat, and thereafter, the writing ball is forced a small distance axially in the direction out of the socket without removing it from the socket so as to produce the required diverging clearance.

In order that the present invention may be more readily understood, reference will now be made to the accompanying drawings.

FIG. 2 is a similar view illustrating a first step in the operation of enlarging the clearance between the ball and the lateral seat;

FIG. 3 is a view in longitudinal section illustrating a conventional very slender tubular nib;

FIG. 4 is a similar view illustrating the step of FIG. 2 as applied to the nib of FIG. 3;

FIGS. 7, 8, and 9 are views of a finished writing extremity illustrating the distribution of ink during operation.

Figure 1:
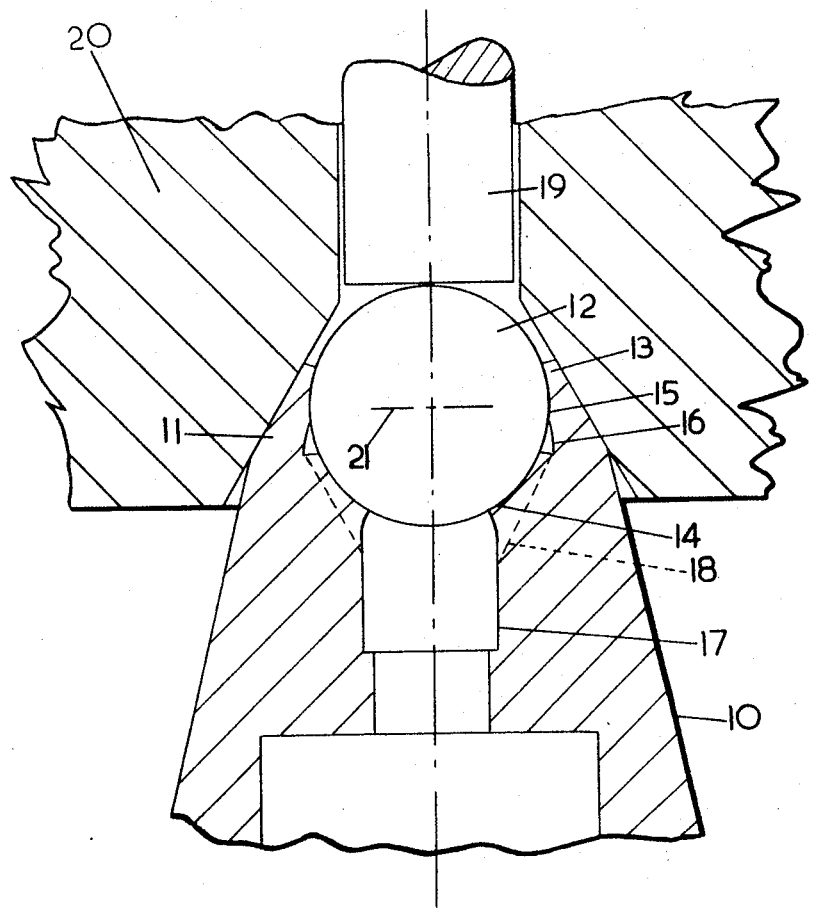
FIG. 1 is a view in longitudinal section illustrating the operation of closing of housing around the ball to form the base seat and the lateral seat.

Turning first to FIG. 1, the writing extremity or nib 10 therein illustrated has a tapered exterior and at its small end is provided with a socket or housing, indicated generally at 11, in which a writing ball 12 is rotatably retained by an inturned rim or lip 13. The housing 11 provides in its interior a part-spherical base seat 14 conforming closely to the curvature of the ball surface and affording a back stop for the ball, a substantially part-spherical lateral seat 15 encircling the ball, and an annular ball encircling cavity 16 separating the lateral seat 15 from the base seat 14. The centers of curvature of the base seat and the lateral seat lie on the longitudinal axis of the nib housing, and at this stage coincide. There is a central feed duct 17 leading axially through the base seat 14 to the socket or housing to supply ink to the ball, and the base seat is intersected by a plurality of ink grooves or channels 18 leading laterally outwards from the feed duct to the cavity 16 so as to communicate with the latter and to subdivide the base seat 14 into a plurality of base seat surfaces, preferably five or six.

The socket is initially of cylindrical or slightly tapered form, and of an appropriate depth, with the base seat 14 (subdivided by the grooves or channels 18) partially formed therein. The ball 12 is inserted in this cavity and is positioned by a stop 19 while the walls of the cavity are constricted around the ball in conventional manner by a conical die 20, which, for example, by means of impact, coins the material of the housing closely to the ball. In doing so, the lip 13 (which is usually about 0.003 inch thick) is closed in around the ball, the lateral seat 15 is formed, and the base seat 14 is completed; these seats are of part-spherical form. There is no substantial clearance between them and the ball at this stage, but the extent to which the lateral seat 15 extends above the ball equator is between 3.5 and 8 percent and below the ball equator 21 is between 17 and 25 percent, as hereinbefore specified, and the final configuration and area of the base seats 14, are determined.

The second operation, illustrated in FIG. 2, is to apply a hollow cylindrical die 22 to the forward end of the nib and to exercise external pressure, by impact or a steady force, in a plane 23 located at a distance of approximately 1 ball diameter to the rear of the ball center. This operation slightly enlarges the lateral ball clearance along the lateral seat 15, as described, for example, in the Fehling United States Patent No. 3,000,090.

FIG. 4 illustrates the application of the second operation to a very slender tubular nib, the conventional form of which is shown in FIG. 3 (external diameter 1.6 mm.). In order to apply the second operation with success, this forward shape has to be modified either as indicated by the chain line on the left hand or that on the right hand side in FIG. 3. This is necessary in order to apply the external pressure at the right distance from the ball center as shown in FIG. 4, which, in this case, is a little over 1 ball diameter to the rear of the ball center.

Figure 5:
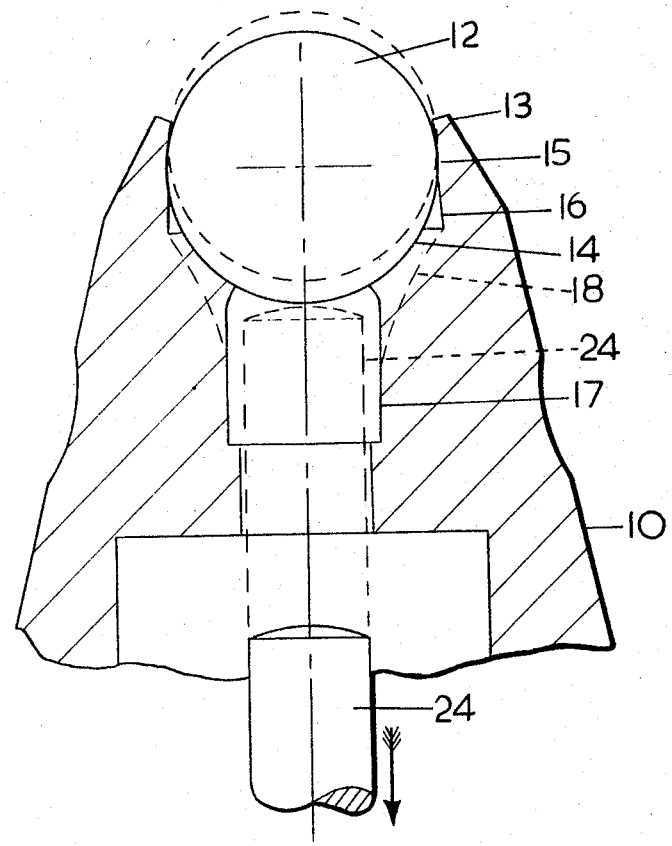
FIG. 5 is a sectional view illustrating a further step providing diverging clearance between the ball and the housing.

The third operation, shown in FIG. 5, consists in lifting the ball 12 from its base seat 14 by means of a peg 24 introduced through the feed duct 17 so as to produce a divergent clearance between the ball and the lateral ball seat. It is only necessary to lift the ball by small amount (0.075 mm. to 0.1 mm. for a 1 mm. ball) in order to produce a lateral seat structure with the optimum divergent clearance which, at the lower edge of the lateral seat, is at least 2 and preferably about 4 microns, and, at the upper edge, is at least 5 and preferably about 10 microns.

Figure 6:
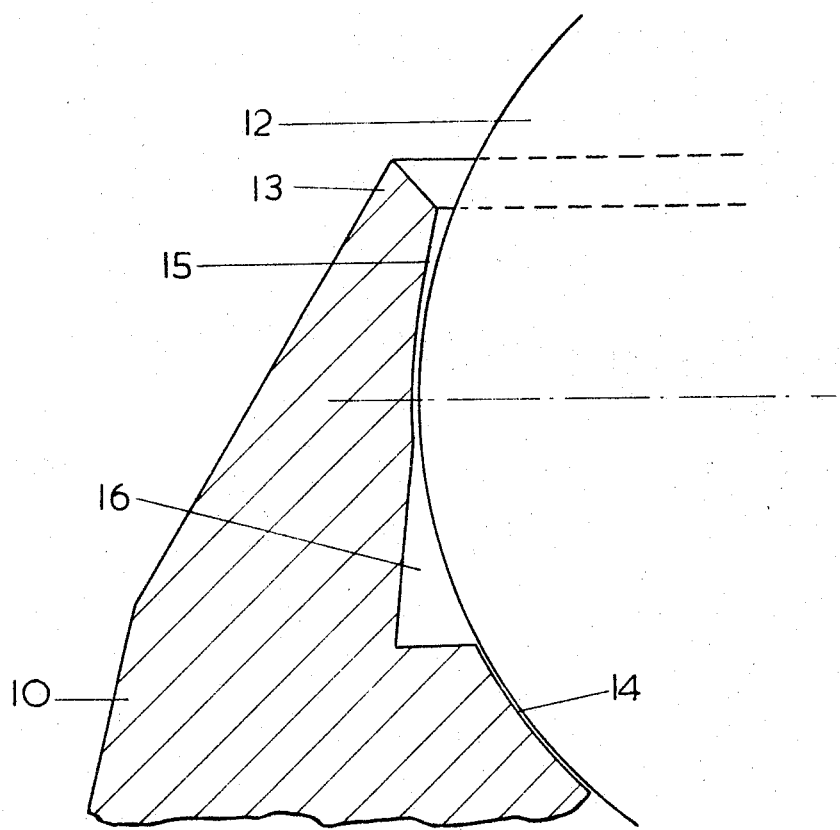
FIG. 6 is a sectional view on a larger scale showing the diverging clearance.

This divergent clearance is illustrated in FIG. 6. From this enlarged view, it will be appreciated that while the lateral seat 15 is circular in all transverse sections normal to the longitudinal axis of the nib housing, the radius of curvature of the lateral seat in all planes containing said longitudinal axis is greater than that of the base seat 14. Furthermore, when the ball is pushed along the longitudinal axis into contact with the base seat, the ball surface does not make contact with the lateral seat, but there exists a clearance between the ball surface and the lateral seat which (a) in all said transverse sections forms a circular annulus of uniform width and (b) in all longitudinal sections containing said axis increases in width from the lower edge of the lateral seat towards its upper edge. The lateral seat is not strictly part-spherical because of the effects of the third operation, but is substantitally so. By way of example, the clearance may be 4 microns at the lower edge of the lateral seat, 4 to 5 microns along the equator, and 10 microns at the upper edge of the lateral seat.

The typical writing extremity shown in FIGS. 5 and 6 had the following dimensions:

Ball diameter _____mm__ 1
Total base seat area (6 seats) _____mm.$^2$__ 0.37
Distance of lower edge of lateral seat below equator
                                              mm__ 0.04
Distance of upper edge of lateral seat above equator
                                              mm__ 0.18
Clearance of lateral seat:
    at lower edge _____microns__ 4
    at upper edge _____do____ 10

It is also preferable that the face of the rim forms, with the ball surface, an ink collecting funnel having in section an angle between the rim face and the ball surface of less than 90° and preferably about 60°. In order to assist the funneling effect, it is preferable that the width of the rim be not less than about 0.06 mm. (0.0025 inch).

A writing extremity or nib according to this invention, and incorporating the preferable features recited above, has the following advantages:

(a) The amount of ink passing the lower edge of the lateral seat is sufficient to provide under all conditions a deep trace having a film thickness of the order of 0.5 micron for a normal trace width of 0.4 mm. produced by a 1 mm. ball.

(b) The considerable amount of surplus ink which emerges from the clearance between the ball surface and the lateral seat and is not deposited on the writing surface can re-enter the housing without accumulating on the rim or lip.

(c) The trace is very uniform and free from local thickening by a deposit of surplus ink, and from local starvation due to breaks in the ink film emerging from the housing. These results cannot be obtained by a housing which is uniformly spherical, i.e., wherein the radius of curvature of both the lateral seat and the base seat is the same and wherein, therefore, the ball clearance is the same all around the ball when the center of the ball and of said seats coincide. In such a housing, any clearance existing between the ball and the lateral seat when the ball is pushed onto the base seat is usually too small and not sufficiently divergent. Moreover, if the lower half of the housing is a shell of uniform internal radius and the clearance is large enough to pass the desired amount of ink, the ball is too free and too easily displaced laterally under the writing force with a consequent tendency of ink to accumulate on the rim or lip and the trace to be less uniform.

It will be appreciated that the housing structure herein defined does not persist if too much wear occurs in writing and that there is a tendency for the housing to be converted by such wear into a shell of uniform curvature. It is, therefore, preferred, particularly in the case of nibs for use with large capacity ink reservoirs, to have a wear resistant housing, for example, one which is made of work hardened copper and in which the seats of the ball housing have a Brinell hardness not substantially exceeding 120.

It should be noted that if only the second operation were applied to increase the lateral clearance (for example, by applying greater external pressure) the lateral clearance in transverse sections would be less uniform and would not have the essential divergent feature. On the other hand, were the second operation to be omitted a much larger lifting stroke would have to be employed in the operation illustrated in FIG. 5 in order to obtain a suitably large clearance at the lower edge of the lateral seat. This result is, however, not always achieved. At the same time, due to this excessive lift, the clearance would be too divergent with deleterious results as regards uniformity of trace.

It might be thought that the desired divergent clearance could be produced by pushing the ball into the housing instead of lifting the ball out of it. By pushing the ball deeper into the housing, it is certainly possible, as is obvious from purely geometrical considerations, to create a divergent gap above the equator. However, below the equator the seats would form part of the same spherical shell, and for this reason there would be no gap at all along the lower part of the lateral seat, as is essential in the present invention. On the contrary, by pushing the ball into the housing the housing walls below the equator are stressed in tension, so that they tend to grip the ball elastically. A very faint trace and a stiff feel of the instrument in use are the consequences.

It is not clearly understood why this combination of the second and third operations produces the desired result. It may be that the second operation pre-stresses the material of the housing wall in such a way as to greatly assist the effect of the third operation in pushing the housing walls laterally outwards.

The reasons why this configuration of the clearance round the ball is essential to obtain the three advantages mentioned above are also not fully understood. But, the principal explanation appears to be the following.

Contrary to any other writing instrument, only part of the ink "offered" to the writing surface (by the rotating ball of a ball point pen) is deposited while the remainder is "rejected" and must be disposed of. The "rejected" part of the ink film will either re-enter completely into the housing, which is one of the objects of the present invention, or if it cannot do this, will accumulate on the outside of the ball housing, thus causing undesirable messiness. The "rejected" ink consists firstly of that part of the ink film on the ball which, though in contact with the writing surface, is not taken up by it, and secondly by the ink film, on both sides of the contact area where the segments of the protruding ball do not touch the writing surface during writing. The first part of the "rejected" ink will be called the "central surplus" (indicated at 25 in FIG. 7) and the second the "lateral surplus" (indicated at 26a and 26b in FIG. 7). It would follow that, unless the ball clearance on the re-entrant side is of such a size and so disposed that both the central and the lateral surplus can re-enter the interior of the housing, the nib will get messy.

The second basic fact is that, during writing, and mainly due to the direction of the writing pressure on the ball, the ball will tend to be displaced within the housing in such a way that the clearance at the lower edge of the lateral seat becomes larger on the emerging side than on the re-entrant side of the ball (as illustrated by FIG. 8), thus creating a bottleneck for the passage of the surplus. In a spherical housing (in the sense that all seats are part of the same spherical shell) this is inevitable, and a messy nib can only be avoided by cutting down the surplus, i.e., by limiting generally the amount of ink "offered" to the paper and by a careful choice of the ink.

If, however, as in the present invention, the housing is not uniformly spherical and is so constructed that, when the ball is pressed back into the housing, it fits the base seat while leaving a clear gap round the lateral seat, particularly at its lower edge, as viewed in FIGS. 5 and 6, the formation of a bottleneck is greatly reduced or eliminated. If the base seat, as is preferred, is large enough, it will hold the ball in a more central position and thus avoid that the relative difference between the lateral seat clearances on the emerging and the re-entrant side becomes too large.

The third factor of major importance is the necessity to arrange that the lateral surplus can, on re-entering the nib, spread laterally towards the surface of the ball covered with the central surplus as illustrated by the arrows in FIG. 9. The thickness of the ink film forming the lateral surplus is obviously the same where it emerges from, and where it re-enters into, the housing. If there is, therefore, the slightest displacement of the ball under the writing pressure, the lateral surplus cannot completely re-enter the housing unless it spreads towards the area of the ball surface which has been partly or wholly denuded of ink by deposition on the writing surface.

This lateral inward shift or spread of the lateral surplus can only take place after it has passed the rim on re-entry, because on the protruding surface of the ball there is no force available which could produce this lateral shift. Hence, the clearance of the lateral seat at the rim must be substantially larger than at its lower edge, as shown in FIG. 6, so that under any circumstances which may arise the total surplus can in fact be "re-swallowed" by the clearance on the re-entrant side above the equator. The shape of the lateral seat clearance viewed in a longitudinal section is, therefore, divergent in the direction of flow on the emerging side and convergent on the re-entrant side. It is this convergent shape which exercises a pressure on the re-entering lateral surplus and diverts part of it towards the denuded central area of the ball. This lateral motion of the ink film is highly complex and is not understood in detail, but it was found that a divergent gap of the kind described in this specification will achieve the desired result.

In particular, the lateral motion of the ink film will also be influenced by the speed of writing, the angle between the rotational plane of the ball and the equatorial plane, the degree of change in direction of the trace in writing, and the physical properties of the ink. And the degree of surplus will, of course, greatly depend on the amount of ink taken up by the paper, i.e., on the properties of the latter.

In order to assist the safe disposal of the ink surplus, it was also found that it was desirable to limit the depth of the lateral seat below the equator and the degree of ball protrusion. The larger the protruding ball surface, the larger will obviously be the area not in contact with the writing surface and covered with the lateral surplus.

Although the invention has been described herein with reference to specific embodiments, many modifications and variations therein will readily occur to those skilled in the art. Accordingly, all such variations and modifications are included within the intended scope of the invention, as defined by the following claims.

We claim:
1. A method for making a ball point writing instrument comprising inserting a writing ball into a housing having a ball-receiving socket with a central internal ink feed duct leading to the rear of the socket to supply ink to the ball, a base seat having a plurality of integral base seat elements disposed about the terminus of the ink feed duct and formed with part spherical base seat surfaces to provide support for a writing ball during writing, the base seat being intersected by a plurality of ink channels leading laterally outwards from the feed duct and a lip projecting forwardly about the socket at the forward end of the housing, deforming the lip laterally inwardly in the region surrounding the ball to cause the inner surface of the lip to conform to the shape of the ball and thereby provide a part-spherical lateral ball seat surrounding the ball both forwardly and rearwardly of the equator thereof, deforming the socket by an axially applied force to provide a slight clearance between the ball and the part-spherical lateral seat, and forcing the writing ball axially in the direction out of the socket a distance no greater than about one-tenth the diameter of the writing ball without removing the ball from the socket to produce a diverging clearance between the ball and the lateral ball seat which increases toward the forward end of the lip.

2. A method according to claim 1 wherein the socket is deformed to provide a slight clearance by applying a rearwardly directed force to the socket about its outer surface in a region approximately one ball diameter rearwardly of the center of the writing ball.

3. A method according to claim 1 wherein the writing ball is forced axially by inserting a peg through the ink feed duct to engage the rear surface of the ball and imparting relative axial motion between the peg and the housing.

4. A method according to claim 1 wherein the writing ball is forced axially a distance between about 0.075 and 0.10 times the diameter of the writing ball.

5. A method according to claim 1 wherein the lip is deformed to provide the lateral ball seat by imparting a laterally constricting force to the outer surface of the lip.

6. A methtod according to claim 5 wherein the base seat elements are deformed to produce part-spherical ball seating surfaces thereon simultaneously with the lateral ball seat by forcing a conical member axially rearwardly against the outer surface of the lip in the region surrounding the ball while holding the ball axially against the base seat elements.

References Cited by the Examiner
UNITED STATES PATENTS

| | | | |
|---|---|---|---|
| 2,976,610 | 3/1961 | Schuck | 29—441 |
| 2,983,253 | 5/1961 | Henricksen | 120—42.4 |
| 3,000,090 | 9/1961 | Fehling | 29—441 |
| 3,099,082 | 7/1963 | Henricksen | 29—441 X |

JOHN F. CAMPBELL, *Primary Examiner.*

THOMAS H. EAGER, *Examiner.*